United States Patent [19]  
Sato

[11] 4,317,512  
[45] Mar. 2, 1982

[54] MULTIPLE-DISK CLUTCHES
[75] Inventor: Tadashi Sato, Atsugi, Japan
[73] Assignee: Amada Company, Limited, Isehara, Japan
[21] Appl. No.: 165,064
[22] Filed: Jul. 1, 1980
[30] Foreign Application Priority Data Jul. 2, 1979 [JP] Japan .................................. 54-82704

[51] Int. Cl.³ ...................... F16D 25/063; B60K 41/24
[52] U.S. Cl. ............................. 192/85 AA; 192/18 A; 192/70.28
[58] Field of Search .......... 192/85 AA, 85 A, 85 AB, 192/12 C, 13 R, 18 A, 18 R, 70.21, 70.28

[56] References Cited  
U.S. PATENT DOCUMENTS 3,835,971  9/1974  Spanke et al. .................... 192/18 A
4,135,611  1/1979  Spanke ............................. 192/18 A
4,183,425  1/1980  Sommer ........................... 192/18 A Primary Examiner—George H. Krizmanich  
Attorney, Agent, or Firm—Wigman & Cohen

[57] ABSTRACT

The present invention relates to a multiple-disk clutch comprising an input shaft; an output shaft having splines formed thereon; a plurality of clutch disks slidably disposed on the output shaft for engagement with the splines; a clutch plate, provided on the output shaft, for pushing the plurality of clutch disks into engagement with the splines; a first rod for transmitting driving force from the input shaft to the output shaft through the plurality of clutch disks; and a second rod for pushing the output shaft in the opposite direction of the first rod so as to cancel the thrust force caused by the first rod moving in the direction in which the clutch is moved for power engagement. The advantages obtained by this structural engagement of these elements making up the opposition forces include the reduction of bearing wear.

4 Claims, 3 Drawing Figures

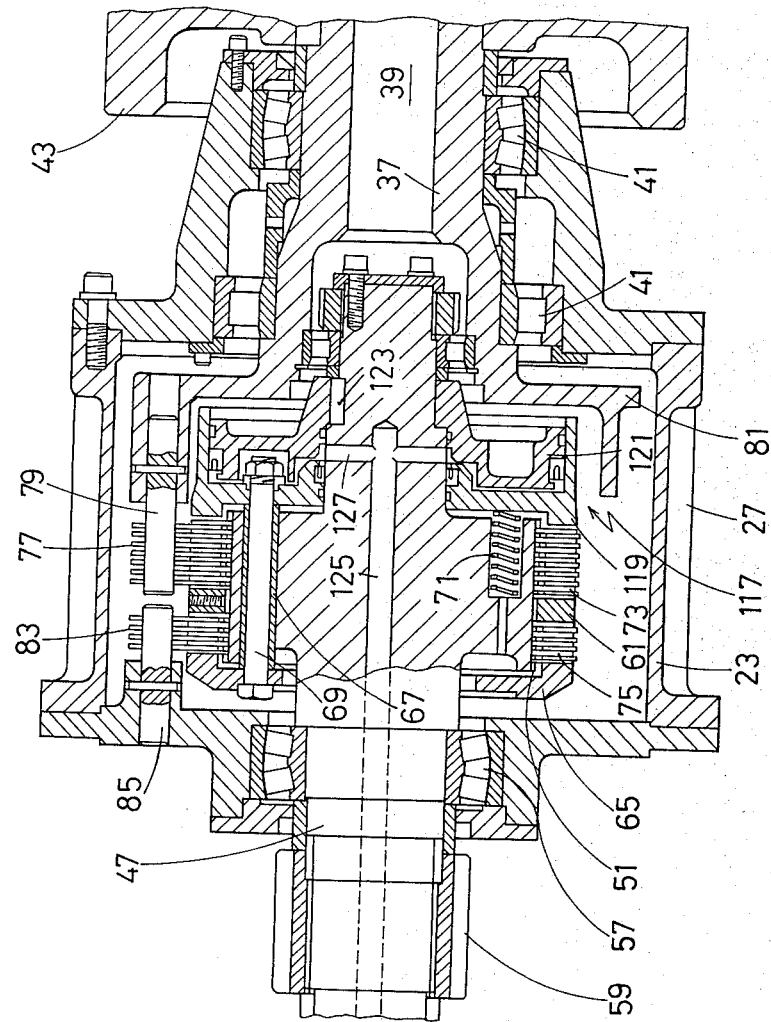

MULTIPLE-DISK CLUTCHES

BACKGROUND OF THE INVENTION

1. Field of the Invention

The present invention relates generally to clutches for connecting and disconnecting driving members and driven members so as to connect and disconnect the driving force in machines such as mechanical presses and, more particularly, the invention relates to what is called multiple-disk clutches having a plurality of disks for connecting and disconnecting the driving and driven members.

2. Description of the Prior Art

As is well-known, clutches having disks and often referred to as multiple-disk clutches are used to connect and disconnect driving members and driven members so as to connect and disconnect driving members and driven members to connect and disconnect the driving force in machines such as mechanical presses mostly in a manner such that working parts are bathed in oil during operation. Summarily stated, the clutches of this type have an input shaft radially provided with a plurality of axially movable disks and an output shaft which is disposed in coaxial relation with the input shaft and also have a plurality of axially movable disks disposed in engagement with the disks of the input shaft. More particularly, the arrangement is that each of the disks of the input shaft is disposed between a respective pair of the disks of the output shaft and all the disks of both of the shafts are axially movable but are not rotatable with respect to the shafts. Thus, the clutches of this type are so arranged as to connect the driving members by the friction of the disks and the driven members when the disks of both of the shafts are axially pressed and also disconnect them when the disks are released from the pressure. In this arrangement, the input shaft and the output shaft are conventionally journaled in thrust bearings to cope with the thrust load which occurs and acts when the disks are axially pressed to connect and disconnect the driving members and the driven members.

In the above described conventional multiple-disk clutches, one of the disadvantages has been that a high degree of heat will occur during operation. In wet multiple-disk clutches in which the working members are lubricated and cooled by oil, the heat will be produced to the extent that the oil temperature goes up to 50° C. above the atmospheric temperature and often up to about 80° C. in the summertime in mechanical presses. A high degree of heat produced in multiple-disk clutches mounted in a mechanical press, for instance, will be conducted to and deform the frame of the press and injure the processing accuracy of the press.

The undesirable heat in the multiple-disk clutches is produced from the thrust bearings among others because of the thrust load when the disks of the input shaft and the output shaft are axially pressed to connect and disconnect the driving and driven members. Thus, in order to reduce the heat in the multiple-disk clutches, it is desired that the thrust load be eliminated when the driving and driven members are connected and disconnected with each other. Furthermore, it is desired to eliminate the thrust bearings from the multiple-disk clutches, since the thrust bearings are costly and subject to wear and damage as compared with radial bearings.

SUMMARY OF THE INVENTION

It is an object of the present invention to provide a multiple-disk clutch for machines such as mechanical presses in which no thrust load will act on the bearings of the input and output shafts when the disks of the input and output shafts are axially pressed to connect and disconnect the driving and driven members.

It is therefore another object of the present invention to provide a multiple-disk clutch in which the heat produced during operation is much reduced.

Accordingly, it is therefore another object of the present invention to provide a multiple-disk clutch which will increase the processing accuracy of a machine such as a mechanical press in which it is mounted.

It is a further object of the present invention to provide a multiple-disk clutch in which thrust bearings are much reduced in number.

It is therefore another object of the present invention to provide an economical clutch which is low-cost and will stand long use.

Other and further objects and advantages of the present invention will be apparent from the following description and accompanying drawings which, by way of illustration, show a preferred embodiment of the present invention and the principle thereof.

BRIEF DESCRIPTION OF THE DRAWINGS

FIG. 3 is a sectional view showing a modified embodiment of the multiple-disk clutch according to the present invention.

DESCRIPTION OF THE PREFERRED EMBODIMENTS

Figure 1:
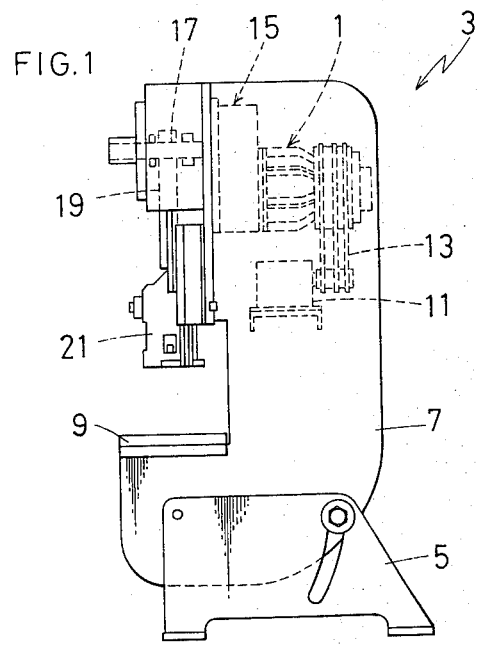
FIG. 1 is a side view of a mechanical press in which a multiple-disk clutch embodying the principle of the present invention can be mounted.

Referring to FIG. 1, a multiple-disk clutch assembly 1 according to the present invention can be used for a mechanical press 3 comprising a base 5 and a frame 7 having a work-table 9 on which a workpiece to be processed is to be placed. In the mechanical press 3, the multiple-disk clutch assembly 1 is so mounted as to be driven by a motor 11 by means of a belt or belts 13 and connected with a driving unit 15 for driving an eccentric shaft 17 connected by a connecting rod 19 to a vertically movable ram 21. Thus, when the multiple-disk clutch assembly 1 is worked to connect the driving force of the motor 11 to the driving unit 15, the eccentric shaft 17 is rotated to enable the ram 21 through the connecting rod 19 to process the workpiece placed on the worktable 9. In this connection, it is to be noted that the multiple-disk clutch assembly 1 according to the present invention is not limited in application to the mechanical press 3 shown in FIG. 1 and it can be used for a variety of machines.

Figure 2:
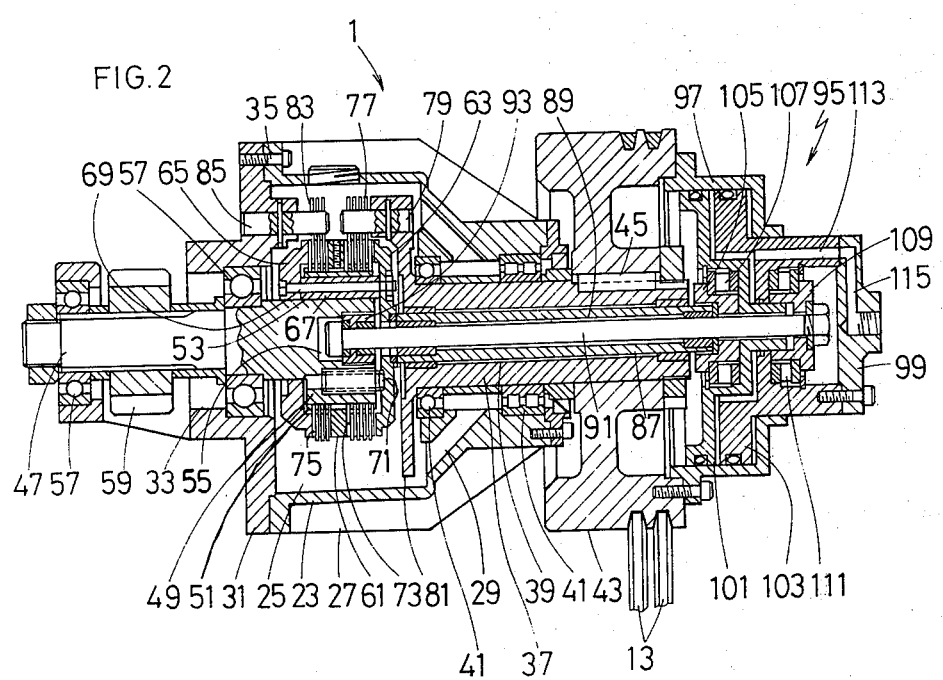
FIG. 2 is a sectional view showing a multiple-disk clutch embodying the principle of the present invention.

Referring to FIG. 2, the multiple-disk clutch assembly 1 is constructed of a casing 23 which is more or less cylindrical in shape and has a cylindrical inside concavity 25. The casing 23 may be formed at its outside surface with a plurality of fins 27 for radiation and also provided with passages 29 for coolant oil, and it is closed by a cover member 31 having at its center a hole 33 by means of a plurality of bolts 35. Thus, the casing 23 can contain the coolant oil in its inside cavity 25 so that working parts therein may be bathed in the oil for lubrication and cooling.

The casing 23 of the above described construction includes a cylindrical input shaft 37 which is formed at its axial center with a cylindrical hole 39 which is axially outwardly open at its end for a purpose to be described hereinafter in great detail. The input shaft 37 is disposed along the axial center of the casing 23 with its outer end projected out of the casing 23 and it is rotatably journaled in a plurality of radial bearings 41. Also, the input shaft 37 is fixed at its projecting outer end with a driving pulley 43 secured thereto by a key 45 so that it may be constantly driven during operation. It will be readily seen that the driving pulley 43 is driven by the motor 11 through the belt or belts 13 when the multiple-disk clutch assembly 1 is mounted in the mechanical press 3 as shown in FIG. 1.

The casing 23 includes also an output shaft 47 which is disposed in coaxial relation with the input shaft 37 along the axial center of the casing 23 and with its outer end projected out of the casing 23. The output shaft 47 is formed at its inner end with a large diameter portion 49 which is provided with a plurality of splines 51, a plurality of axial holes 53 and a single larger axial hole 55. The splines 51 are axially formed like teeth of a spur gear around the outside of the large diameter portion 49 of the output shaft 47, and the axial holes 53 are axially formed through the large diameter portion 49 of the same, while the axial hole 55 is formed along the axial center of the output shaft 47. The output shaft 47 of the above described configuration is rotatably journaled in a plurality of radial bearings 57, and it is provided at its outer end with a gear 59. As will be readily understood, the gear 59 of the output shaft 41 is engaged with another gear of the driving unit 15 when the multiple-disk clutch assembly 1 is mounted in the mechanical press 3 shown in FIG. 1.

The large diameter portion 49 having the splines 51 of the output shaft 47 is provided at its periphery with an annular member 61 fixed at the central portion thereof like a flange. Also, a pair of pushing plates 63 and 65 which are more or less dish-like in shape are axially movably mounted opposite to each other at both ends of the large diameter portion 49 of the output shaft 47 in such a manner as to interpose the large diameter portion 49 therebetween. The pushing plates 63 and 65 are held spaced from each other by a plurality of cylindrical spacers 67 which are slidably inserted in the axial holes 53 formed through the large diameter portion 49 of the output shaft 47 and are longer than the axial length of the large diameter portion 49. Also, the pushing plates 63 and 65 are integrally connected with each other by a plurality of tying rods 69 such as bolts which are inserted in the cylindrical spacers 67. Furthermore, the pushing plates 63 and 65 of the above described arrangement are kept biased by a plurality of springs 71 toward the input shaft 37. From the above description, it will be understood that the pushing plates 63 and 65 can be integrally moved together in the axial direction of the output shaft 47 toward and away from the annular member 61.

A plurality of annular-shaped and internally splined clutch friction disks 73 are mounted in engagement with the splines 51 of the large diameter portion 49 of the output shaft 47 between the annular member 61 and the pushing plate 63 so that they may be axially movable along the splines 51. Likewise, a plurality of annular-shaped and internally splined brake friction disks 75 are engaged with the splines 51 between the annular member 61 and the pushing plate 65 so that they may be axially movable therebetween. Also, a plurality of annular clutch disks 77 which are larger than the clutch friction disks 73 in diameter are provided in engagement with the clutch friction disks 73 in a manner such that each of the clutch disks 77 are interposed between a respective pair of the clutch friction disks 73. The clutch disks 77 are slidably held by a plurality of pins 79, which are fixed to a flange-like member 81 provided at the inner end of the input shaft 37, so that they may be moved together with the clutch friction disks 73 in the axial direction of the output shaft 47. In this connection, it will be understood that the clutch disks 77 will be rotated by the input shaft 37 by means of the pins 79 when the driving pulley 43 is driven. Also, in the same manner as the clutch disks 77, a plurality of annular brake disks 83 are mounted in engagement with the brake friction disks 75. The brake disks 83 are also slidably held by a plurality of pins 85 which may be fixed to the cover member 31 of the casing 23.

In the above described construction, the output shaft 47 is arranged to be rotated by the input shaft 37 by means of the pins 79, the clutch disks 77, and the clutch friction disks 73 when the pushing plate 63 is moved toward the annular member 61 to press the clutch disks 77 and the clutch friction disks 73 toward the pushing plate 63. Also, the output shaft 47 is arranged to be stopped from rotating by the brake friction disks 75, the brake disks 83, and the pin 85 when the pushing plate 65 is moved toward the annular member 61 to press the brake disks 83 and the brake friction disks 77. As is readily apparent, when the clutch disks 77 and the clutch friction disks 73 are pressed by the pushing plate 63 toward the annular member 61, the brake disks 83 and the brake friction disks 75 will be released by the pushing plate 65 away from the annular member 61 so as to enable the output shaft 47 to be rotated by the input shaft 37. To the contrary, when the brake disks 83 and the brake friction disks 75 are pressed by the pushing plate 65 toward the annular member 61, the clutch disks 77 and the clutch friction disks 73 will be released by the pushing plate 63 away from the annular member 61 to disconnect the output shaft 47 from the input shaft 37. Of course, it will be understood that the output shaft 47 will not be related normally unless the pushing plate 63 is positively moved toward the annular member 61 to press the clutch disks 77 and the clutch friction disks 73, since the pushing plate 63 is normally biased by the springs 71 away from the annular member 61 with the pushing plate 65 biased toward the annular member 61. Thus, the output shaft 47 is kept normally disconnected from the input shaft 37, and it can be connected with the input shaft 37 when the pushing plates 63 and 65 are moved to press the clutch disks 77 and the clutch friction disks 73 and release the brake disks 83 and the brake friction disks 75.

A cylindrical push rod 87 having a cylindrical hole 89 is slidably inserted in the cylindrical hole 39 of the input shaft 37 with its inner end disposed in contact with the pushing plate 63. Thus, when the pushing plates 63 and 65 will be moved against the springs 71 to press the clutch disks 77 and the clutch friction disks 73 toward the annular member 61 there will be a release of the brake disks 83 and the brake friction disks 75 away from the annular member 61 so as to connect the output shaft 47 with the input shaft 37. Also, a holding rod 91 is slidably inserted in the cylindrical hole 89 of the push rod 87 and is rotatably connected to the inner end of the output shaft 47 by means of an annular nut 93 which is fixed in the axial hole 55 of the output shaft 47. The holding rod 91 is so designed as to hold the output shaft 47 against the force urged by the push rod 87 toward the pushing plate 63 so as to offset the thrust load caused by the push rod 87.

In order to drive the push rod 87 and hold the holding rod 91, there is provided a hydraulic or pneumatic motor 95 constructed of a casing 97 which is shown in FIG. 2 as secured to the driving pulley 43 and having a cap 99 and includes a piston 101 for the push rod 87 and another piston 103 for the holding rod 91. The push rod 87 is connected at its outer end with the piston 101 by a rotatable retaining member 105 which is connected to the piston 101 by a thrust bearing 107. The holding rod 91 is designed to slidably extend through the piston 101 and is connected at its outer end with the piston 103 by a rotatable retaining member 109 connected to the piston 103 by a thrust bearing 111. Also, passages 113 and 115 are formed at the piston 103 and the cap 99, respectively, so as to supply the hydraulic or pneumatic fluid into the space between the pistons 101 and 103. Thus, when the hydraulic or pneumatic fluid is supplied into the space between the pistons 101 and 103, the push rod 87 and the holding rod 91 are urged by the pistons 101 and 103, respectively, in opposite directions to each other to offset the thrust load.

Referring to FIG. 3, there is shown a modified embodiment in which a hydraulic or pneumatic motor 117 comprising a cylinder 119 and a piston 121 is directly connected with the output shaft 47 so that the cylinder 119 may be urged by the pneumatic or hydraulic fluid to press the clutch disks 77 and the clutch friction disks 73. In this modified embodiment, the cylinder 119 and the piston 121 are annular-shaped and are disposed around the output shaft 47, and the cylinder 119 is slidably mounted on the output shaft to press the clutch disks 77 and the clutch friction disks 73 toward the annular member 61, while the piston 121 is integrally fixed to the output shaft 47 by a key 123. Also, passages 125 and 127 are formed through the output shaft 47 to supply the pneumatic or hydraulic fluid into the space between the cylinder 119 and the piston 121. Thus, it will be understood that the reaction to the force added by the cylinder 119, when the clutch disks 77 and the clutch friction disks 73 are pressed thereby, is opposed or offset by the piston 121 integrally fixed to the output shaft 47 to offset the thrust load. The modified embodiment shown in FIG. 3 is more or less similar to the first embodiment shown in FIG. 2 in function and construction.

As has been so far described above, the multiple-disk clutch 1 according to the present invention is so designed that the thrust load is offset when the output shaft 47 is connected to the input shaft 37. Accordingly, no heat will occur because of the thrust load and therefore the processing accuracy of the machine using multiple-disk clutch 1 according to the present invention will not be damaged by heat caused by the thrust load. Also, the radial bearings or other means, which are lower in cost and will stand longer use, can be used in place of the thrust bearings which are costly and subject to wear and damage and which are necessary for conventional multiple-disk clutches.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A multiple-disk clutch, comprising:
   an input shaft;
   an output shaft;
   clutch means for engaging and disengaging the power between the input shaft and the output shaft;
   first rod means for moving the clutch means into and out of power engagement, said first rod means pushing the output shaft in the same direction in which the clutch is moved for power engagement; and
   second rod means for moving the output shaft in the opposite direction of the first rod means so as to cancel the thrust force caused by the first rod means moving in the direction in which the clutch means is moved for power engagement.

2. The multiple-disk clutch according to claim 1, wherein said second rod means is arranged coaxially inside the first rod means.

3. The multiple-disk clutch according to claim 1, further comprising motor means for driving the first rod means and for holding the second rod means.

4. The multiple-disk clutch according to claim 3, further comprising pulley means for driving the motor means.

* * * * *